Nov. 13, 1923.
R. M. CORL
1,474,019
METHOD AND APPARATUS FOR FORMING GLASS
Filed Oct. 29, 1918  6 Sheets-Sheet 1
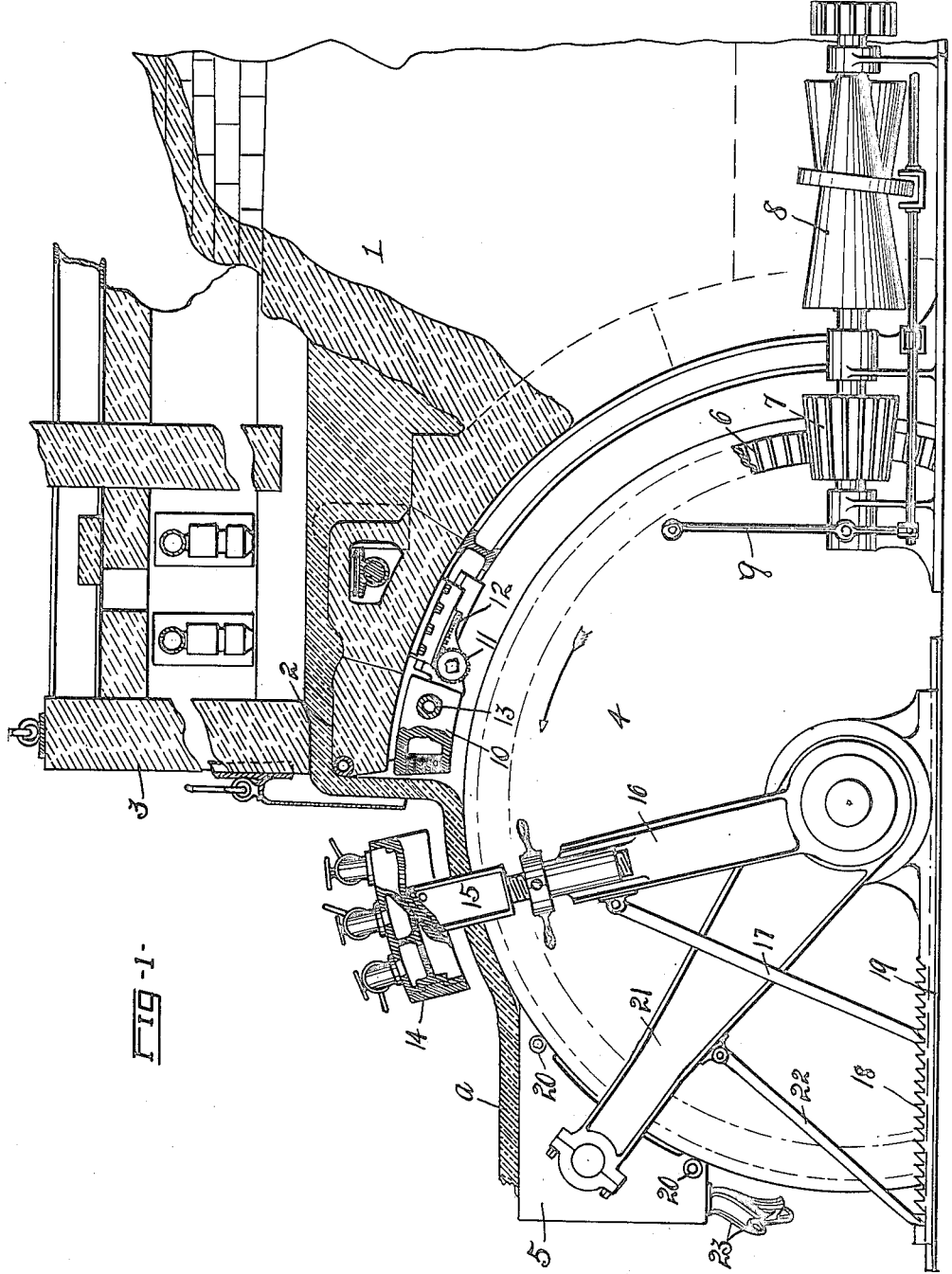
INVENTOR
Robert M. Corl.
By Owen, Owen & Crampton,
His attys.

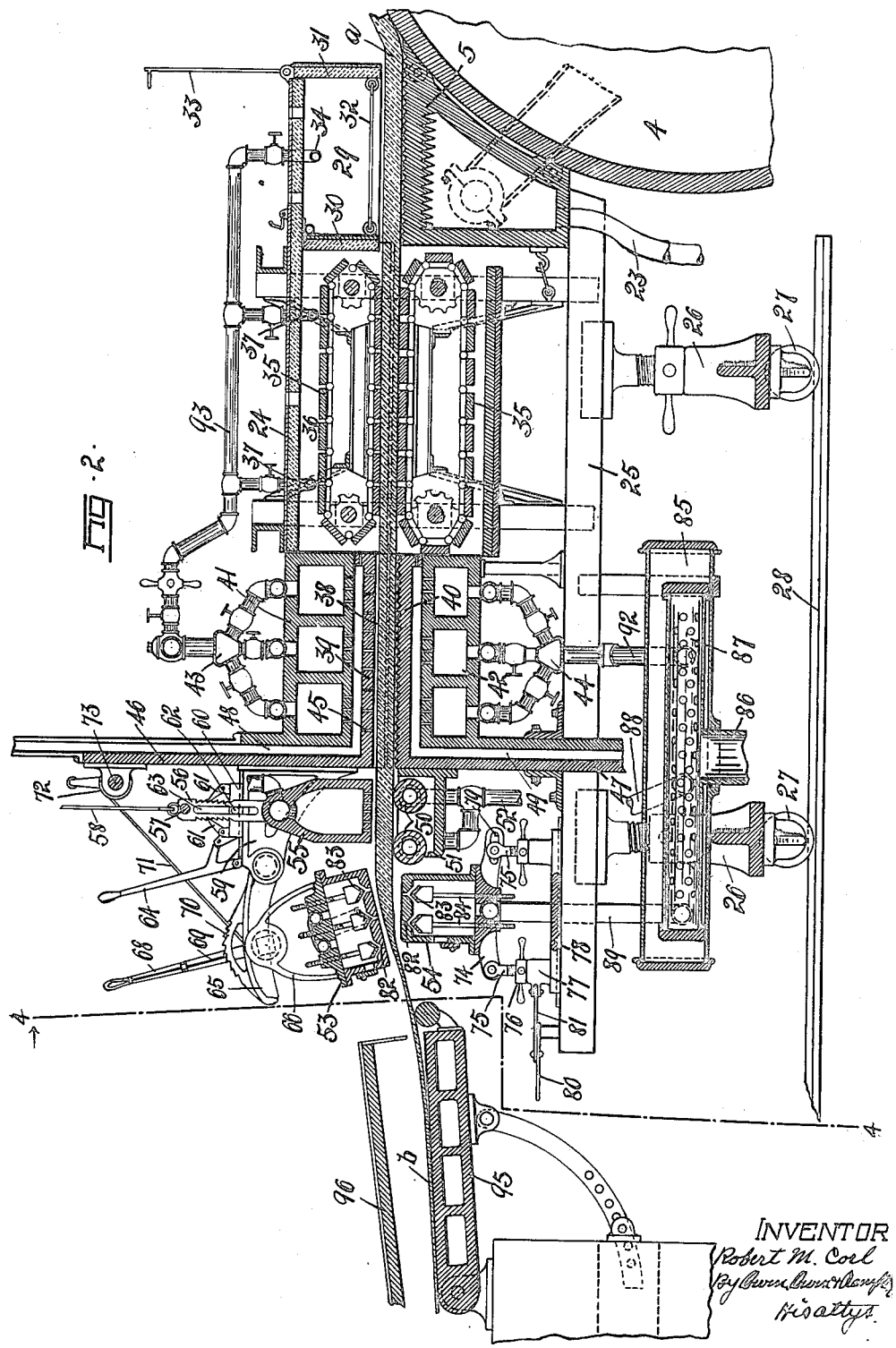

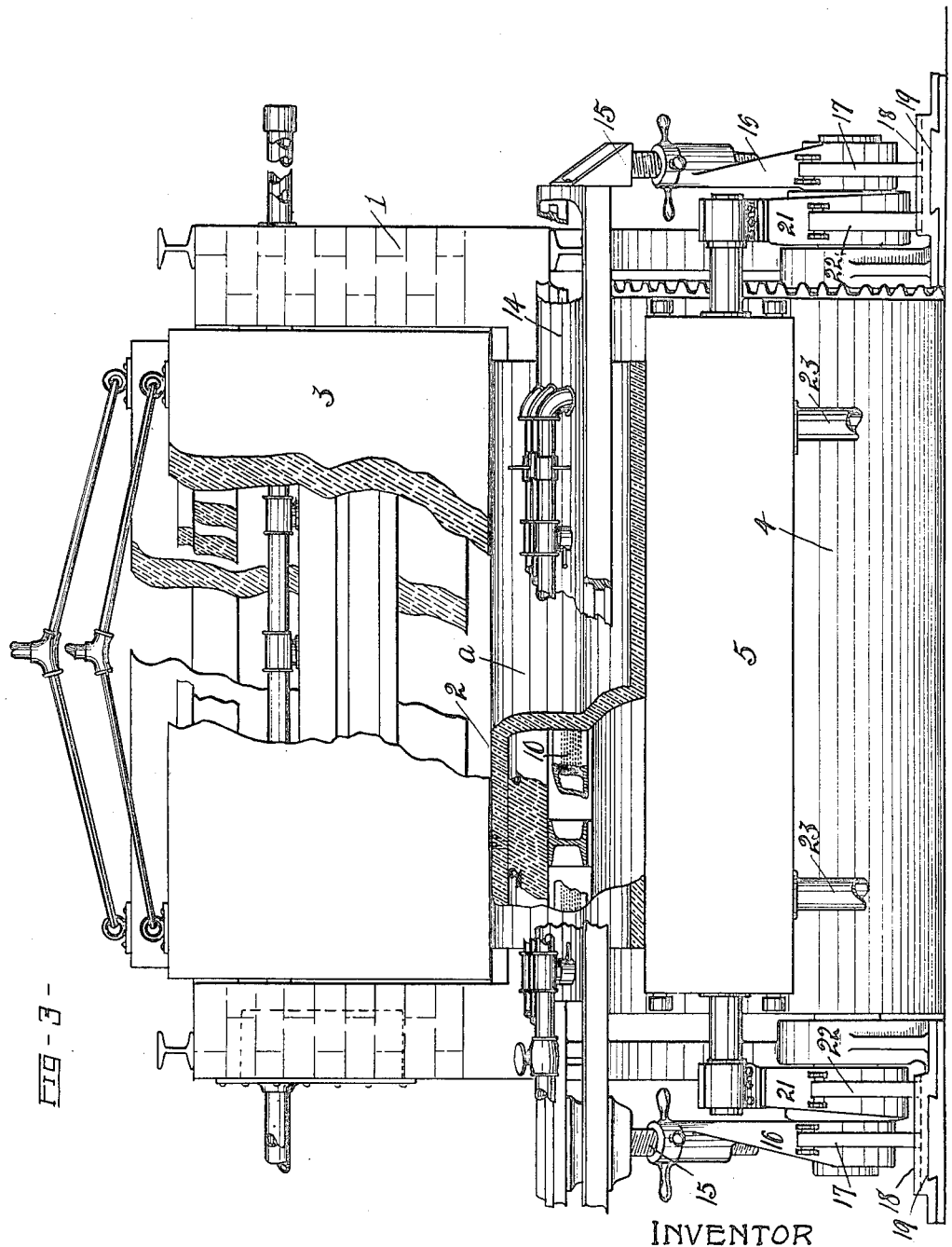

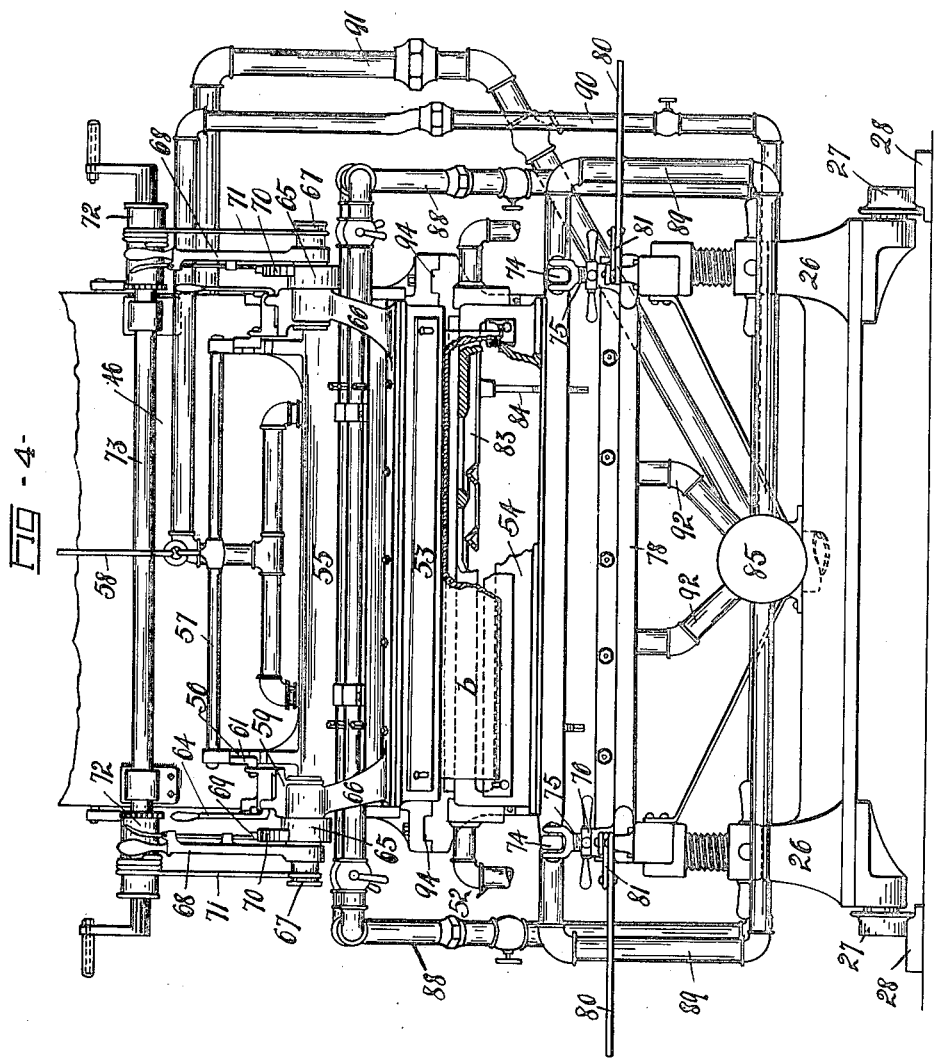

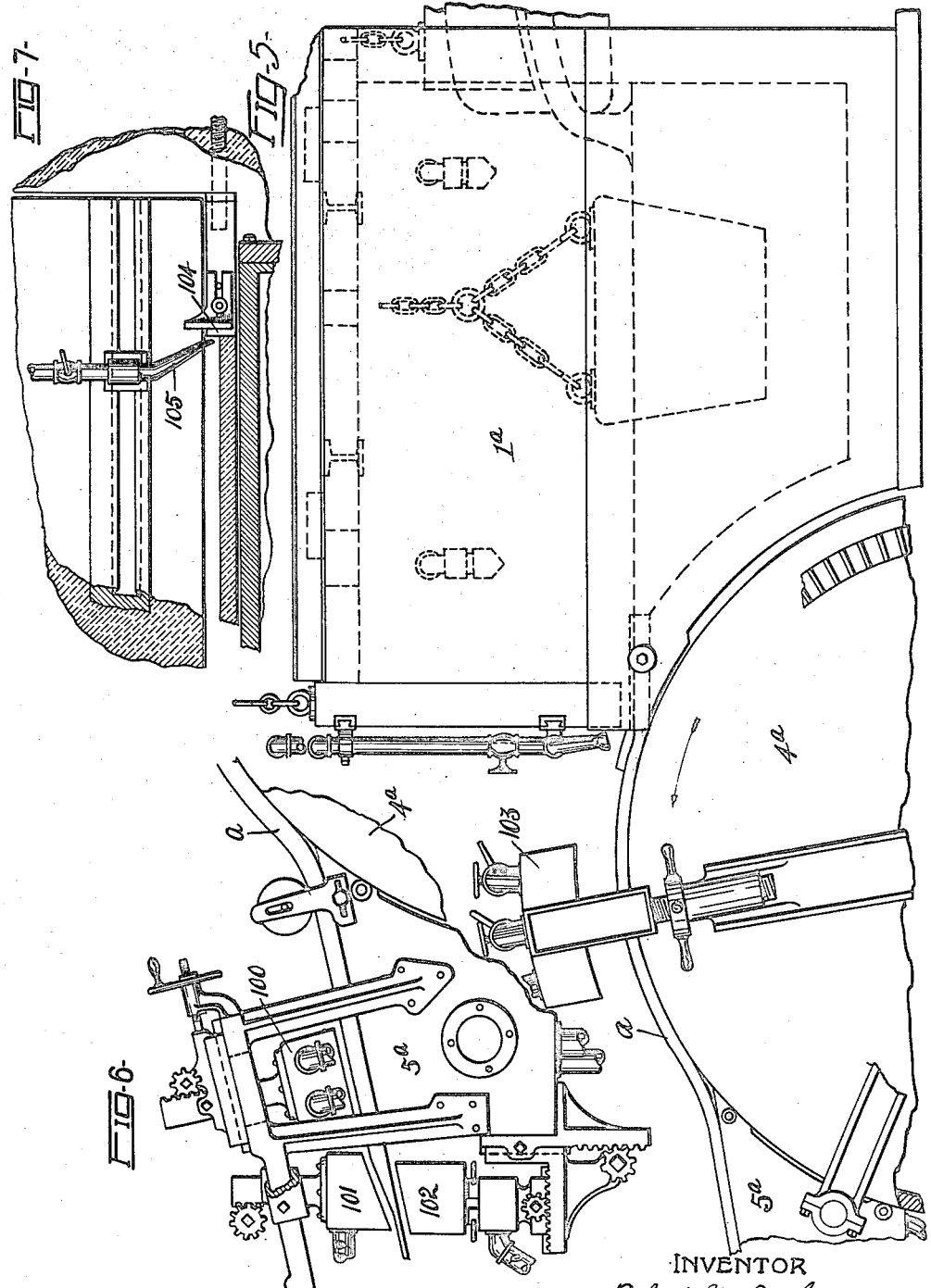

Nov. 13, 1923. 1,474,019
R. M. CORL
METHOD AND APPARATUS FOR FORMING GLASS
Filed Oct. 29, 1918  6 Sheets-Sheet 6
FIG -8-
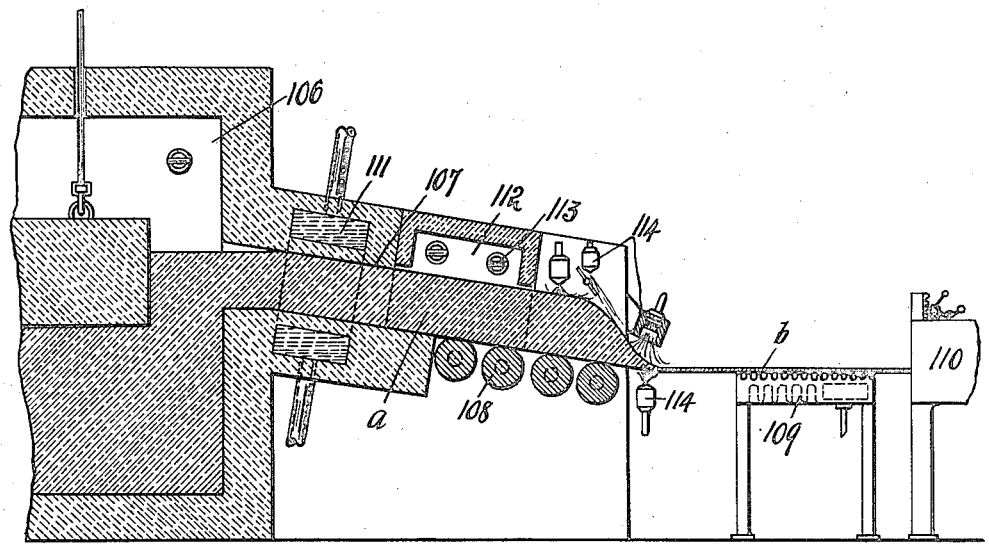
INVENTOR
Robert M. Corl,
By Owen, Owen & Crampton,
His attys.

Patented Nov. 13, 1923.

1,474,019

UNITED STATES PATENT OFFICE.

ROBERT M. CORL, OF MAUMEE, OHIO, ASSIGNOR, BY MESNE ASSIGNMENTS, TO ERIE GLASS COMPANY, OF TOLEDO, OHIO, A CORPORATION OF DELAWARE.

METHOD AND APPARATUS FOR FORMING GLASS.

Application filed October 29, 1918. Serial No. 260,162.

*To all whom it may concern:*

Be it known that I, ROBERT M. CORL, a citizen of the United States, and a resident of Maumee, in the county of Lucas and State of Ohio, have invented a certain new and useful Method and Apparatus for Forming Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to the manufacture of sheet glass, and has for its primary object the production, in a simple, efficient and inexpensive manner of a relatively thin sheet of glass of predetermined width and thickness by the gravity flow of a sheet mass of glass of greater thickness from a source of supply, and the application thereto, while retaining a considerable portion of its heat of formation, of a temperature raising heat to reduce the mass to a sheet of the desired thickness.

This application is filed as a continuation in part of the subject matter of my prior application, Serial No. 232,841, filed May 6, 1918, and it particularly embodies one of the species of the invention disclosed in said application.

In my application, Ser. No. 246,877, filed July 26, 1918, I disclose a means and process for producing finished sheet glass from a sheet mass which is continuously drawn upward from a source of molten supply over a bending roll or the like, and then subjected to a converting temperature which effects a reduction of the sheet mass to a sheet of the desired thickness. The subject matter of the present application differs from that of said application, Ser. No. 246,877, in that it contemplates the gravity flow of a sheet mass from a source of molten supply as distinguished from the drawing of the same upward over bending rolls, or the like, thus avoiding objections incident to the use of such bending rolls.

The drawing of sheet glass is objectionable for the reason that glass does not flow readily at a temperature correct for forming. This is evident, as the process of drawing a sheet vertically from a molten source of supply would not be possible if the glass flowed freely, for it would not have tenacity enough to maintain its shape. It is found that glass, when drawn or flowed directly from a pot to a thickness usual for commercial ware, will solidify or set too quickly on exposure to atmospheric temperature, it being understood that the forming temperature of glass is generally between 1500 and 2000 degrees Fahrenheit, depending on the composition of the glass, and a slight variation of temperature produces a change in the thickness of the glass. This cooling is a source of great annoyance and trouble and many devices have been produced in an attempt to maintain the temperature of the sheet mass constant while it is being manipulated. The thicker the mass of glass the less trouble there will be from chilling, as in a large mass the radiation counteracts, to a considerable extent, the effect of surface chilling so that a thick sheet mass is much less subjected to variation in temperature than a thin sheet.

Flowing glass through a slot or over an edge for the production of commercial ware, such as window glass, has been attempted many times, and I am not aware of any case in which the common commercial thickness of sheet glass has been produced in this manner.

The production of thin or common commercial sizes of sheet glass by the rolling process has also been given extensive trials. Glass when rolled, however, is very inferior in surface finish, the roller, being colder than the glass, causing an uneven cooling of the sheet, and the lack of fluidity of the glass at a forming temperature makes rolling to an even thickness and good finish extremely difficult, if not impossible. If the rollers are of a temperature equal to that of the glass, sticking of the glass to the rollers occurs. I am aware, however, that the rolling of heavy thick plates has been successfully accomplished in the manufacture of plate glass. This process requires a great cost of time and labor and a large proportion of the glass is wasted in the subsequent grinding operations with the result that the ware is expensive.

By my present invention I produce an easily made thick sheet, which may be designated the sheet mass, and after allowing such mass to cool sufficiently for easy handling, I reduce the thickness by the application of a localized high heat to a portion of the sheet mass. This enables the temperature of the sheet mass at the point of formation of the finished or commercial sheet to be readily controlled and the correction of defects in the sheet mass effected. It is found that by this reduction of thickness of the sheet mass most of the surface defects which may exist therein disappear.

The invention is fully described in the following specification, and while the method disclosed is capable of being practiced by numerous apparatus, only a few apparatus for such purpose are illustrated in the accompanying drawings, in which,—

Figure 1 is a side elevation, with parts broken away, and in vertical longitudinal section of parts of the rear end, or molten glass supply and sheet mass forming portion of an apparatus for practicing the invention. Fig. 2 is a vertical longitudinal section of the forward end or converting portion of the apparatus. Fig 3 is a front elevation, with parts broken away, of the portion of the apparatus shown in Fig. 1. Fig. 4 is a front view taken on the line 4—4 in Fig. 2, with parts broken away. Fig. 5 is a side elevation, with parts broken away, of the rear end portion of a modified form of apparatus for practicing the invention. Fig. 6 is a side elevation, with parts broken away, of a modified form of converter used in the present instance in connection with the apparatus of Fig. 5. Fig. 7 is a front fragmentary elevation of the apparatus shown in Fig. 5, and Fig. 8 is a vertical longitudinal section of a different apparatus for practicing the invention.

Referring to the drawings, 1 designates a furnace or other suitable source of molten glass supply, which, in the present instance, is provided with a spillway 2, the width of which is in conformance to the width of the sheet mass to be formed. The vertical thickness of the sheet or stream at its point of flow from the spillway is controlled by a vertically adjustable gate 3.

The glass stream or sheet mass $a$ which flows from the spillway is deposited on a subjacent drum 4, which is driven forward at a speed conforming to the speed of movement or flow of the sheet mass whereby the sheet is advanced by the drum over a supporting table 5, and thence between mechanical feeding means hereinafter disclosed. The drum 4, in the present instance, has an annular gear 6 on one side thereof in mesh with a drive pinion 7 (Fig. 1) the shaft of which pinion is connected to a convenient drive means through a change speed means 8 of any suitable form, having the control lever 9.

The drum 4 is preferably so disposed with respect to the furnace that the vertical plane of its axis is adjacent to the outlet end of said spillway. In practice it is found preferable to slightly cool the inner or under surface of the stream $a$ before having contact with the drum periphery, and for such purpose an air manifold 10 is provided between the drum and spillway in position to direct its air discharge against the rear or inner side of the stream as it flows from the spillway to the drum. This manifold is mounted for adjustment toward and away from the glass stream, such adjustment being effected by the turning of pinions 11 at each end thereof in mesh with racks 12. Air is introduced into the manifold from any suitable source of supply through a conduit 13.

A surface heater 14, in the present instance, in the form of a gas burner is disposed over the drum 4 in position to direct its flame or generated heat against the top surface of the sheet mass $a$ over the drum to prevent a too rapid cooling of the sheet. This burner is preferably carried at each end by a standard 15, which projects down at the respective end of the drum and is connected for longitudinal adjustment to a standard 16, which is journaled on and projects radially from the drum shaft, or at least is journaled on a part which is coaxial with the drum axis. It is thus evident that the burner 14 may be adjusted radially as well as circumferentially of the drum to suit the requirements of the particular case. The standards 16 are supported in any desired position of angular adjustment by bars 17 which may be engaged at their lower ends with any one of a series of teeth 18 provided horizontally on frame parts 19 projecting forward from the standards or members in which the drum trunnions are journaled.

The table 5 has the side thereof adjacent to the drum periphery curved to conform to the curvature of the drum periphery and provided at each end with rollers 20 in rolling contact with the drum periphery at the respective end portions thereof. The table 5 is adjustable in concentric angular relation to the drum axis, being carried for such purpose by end standards or arms 21 and journaled at their inner ends on or in concentric relation to the drum trunnion.

Supporting bars 22 project from the front sides of the standard 21 and are intended to have adjustable engagement with the teeth 18. It is preferable to provide a circulation of cooling water or other fluid through the table 5 and for such purpose the table is made hollow and has inlet and outlet conduits 23 in communication therewith. It is also preferable to provide the glass coacting surface of the table with fine grooves and ridges (shown exaggerated in Fig. 2 of the drawing) so as to lessen the frictional resistance which the table offers to the passage of the sheet *a* thereover.

A housing 24 is provided in advance of the drum and table, and preferably over the latter, for the sheet *a* to pass through preparatory to being converted into a sheet of thinner dimension, as hereinafter described. The housing 24 is carried by a framework 25 having vertically adjustable standards 26, which are preferably provided at their lower ends with rollers 27 for operating on a subjacent track 28. The rear end of the housing 24 is adapted to overhang the table 5 to provide a chamber 29 thereover, the front and rear end walls of which are formed by gates 30 and 31, respectively, which are hinged to the top of the housing up vertical swinging movements and connected together by one or more rods 32 whereby they are caused to have such swinging movements in unison. A control or lever arm 33 projects forward from the upper or rear edge of the rear gate 31 so that a forward swinging of such arm will impart a rearward opening movement to said gates. A predetermined heat is maintained in the chamber 29 by the flame from a gas burner 34 therein. The sheet *a* after leaving the table 5 passes between a set of upper and lower feed belts or aprons 35, which may be geared together to operate at uniform speeds, and are connected to any suitable driving means such, for instance, as a motor (not shown). The sheet advancing speed of the feed belts is the same as the speed of rotation of the drum 4. The feed aprons 35 are located within the chamber 36 of the housing, which is immediately in advance of the chamber 29 and table 5. A desired heat is maintained in the chamber 36 by gas burners 37, or in any other suitable manner.

The housing 24, in advance of the chamber 36, is provided with a vertically narrowed space or passageway 38 through which the sheet *a* feeds, the top and bottom walls 39 and 40 of such passageway being heated to the desired extent by flames from respective upper and lower burners 41 and 42, each of which has a plurality of chambers which are spaced longitudinally of the apparatus and provided with individual valve controlled connection with respective gas supply manifold 43 and 44. The lower wall 40 serves as a supporting table for the sheet *a* in its passage thereover, and the upper wall 39 is disposed in close relation to the top surface of the sheet and preferably provided with a plurality of orifices 45 through which a portion of the heat and flames from the burner 41 may be directed to have impingement against the top surface of the sheet mass. The forward ends of the walls 39 and 40 are respectively angled upward and downward therefrom to form the upper and lower front walls 46 and 47 of the housing 24. The walls 39 and 46 and the walls 40 and 47 cooperate with the burners 41 and 42 to form the flues 48 and 49 respectively, through which the burnt gases and flames from the burners may escape. After leaving the restricted passage 38 the sheet *a* passes over fluid cooled supporting rollers 50, which are journaled at their ends in a bracket 51 secured to the front of the wall 47, and receive a cooling fluid interiorly thereof from pipes 52 leading from any suitable source of fluid supply. It will be understood that a fluid outlet pipe, not shown, is connected to the opposite end of each roller 50.

The sheet *a* in advance of the roller 50, in the present instance, is subjected at top and bottom to a final converting heat which, in the present instance, is applied thereto from upper and lower burners 53 and 54 respectively, in the present instance, of the gas type, and the top of the sheet is also subjected to a temperature raising heat over the rolls 50 by the provision of a burner 55. The burner 55 has an arm 56 projecting upward from each end thereof and these arms are connected at their upper ends by a bar 57, to the center of which, in the present instance, is attached a suspending cable 58 operable to vertically adjust the burner with respect to the sheet. A bracket 59 projects forward from the wall 46 at each end of the burner 55 and carries on its top a block 60 for horizontal adjustment longitudinally of the apparatus. Each block 60 carries a pair of dogs 61 in supporting engagement with teeth on the front and lower edges of the adjacent arm 56. The vertical adjusting movements of the burner 55 with respect to the blocks 60 are guided by pins 62 projecting inward from said blocks into vertical slots or guideways 63 in the arms 56 (Fig. 2). A lever 64 is fulcrumed to the outer end portion of each bracket 59 and has connection with the adjacent block 60, whereby rocking movements of the lever impart horizontal adjusting movements to the respective blocks.

Each bracket 59 has an arm or extension 65 pivoted to and projected forward therefrom for vertical swinging movements. An arm or standard 66 rises from each end of the burner 53 and is pivotally carried by the adjacent bracket arm 65 to adapt the burner 53 to have vertical swinging adjustment with respect to said bracket arms. The pivoted trunnion 67 of each arm 66 has a lever 68 fixed thereto and provided with a hand control latch 69 in engagement with the teeth of a sector 70 on the respective bracket arm 65, thus adapting the burner 53 to be swung in any desired position of adjustment with respect to the sheet *a* by a movement of the lever 68, and to be retained in such position. The vertical swinging adjustment of each bracket arm 65 is effected by the shortening or lengthening of a cable 71, which extends upward and rearward from the respective trunnion 67 to a windlass 72, the shaft 73 of which is journaled in bearing brackets on the front wall 46 and carries an operating crank at each end. The shaft is held from back-turning by pawl and ratchet means, or in any other suitable manner.

The lower burner 54 of the sheet is provided at each end with a cross-arm 74, the ends of which are pivotally engaged and supported by vertical adjusting screws 75, which thread through adjusting nuts 76 supported by bosses 77 on a base plate 78. One screw 75 has its pivot projecting through a slot 79 provided longitudinally in the adjacent end of the cross-arm. It is thus evident that the burner 54 may be both vertically adjusted and transversely tilted with respect to the sheet mass $a$. The base plate 78 extends from one side to the other of the housing frame 25 and is supported for horizontal adjustment longitudinally thereof by the forward ends of the base beams of said frame. Horizontal adjustment of the base plate 78 and burner 54 is effected by the manipulation of levers 80, one of which is fulcrumed to each base beam of the housing frame in advance of the plate and connected thereto by a link 81.

Each burner 53 and 54 is provided with a plurality of longitudinally extending discharge slots 82, which are controlled internally of the burners by valves 83 V-shaped in cross section, and carried by adjusting stems 84, which are threaded outward through the back of the respective burner and controlled from without the burner. The several burners have pipes leading thereto from a manifold 85, which is supplied with a premixed gas through a conduit 86, which opens directly into a pipe 87 provided longitudinally in the manifold 85 and formed throughout its length with a plurality of discharge orifices whereby an even distribution of the gas to the manifold throughout its length is effected. In the present instance, the burner 53 is supplied with gas from the manifold through pipes 88 the burner 54 is supplied with gas through pipe 89, the burner 55 is supplied through the pipe 90, the manifold 43 of the burner 41 is supplied by the pipe 91, and the manifold 44 of the burner 42 is supplied by pipes 92. The burners 34 and 37 are connected by a supply pipe 93 to the pipe 91. The supply pipes of the burners 53, 54 and 55 which are mounted for various adjusting movements, must be of a nature to permit of such adjustments.

The final converting heat which is applied to the sheet by the burners 53 and 54, and particularly by the former, causes a softening of the glass sheet particularly on the top surface thereof, so that the softened glass flows from the forward end of the sheet mass $a$ in thin sheet form relative thereto, such thin sheet being designated $b$. To permit such thinning action the sheet $a$ is preferably several times the thickness of the thinned sheet $b$, which latter is of a thickness suitable for use as window glass, or for other purposes. It is evident that the sheet $a$ after passing between the feed belts 35 is gradually raised to converting condition or to near a flowing temperature by the action of the burners 41, 42 and 55, the final converting heat being applied by the burners 53 and 54. These converting burners are preferably so positioned with respect to the sheet that their surfaces are substantially parallel to the surface of the sheet at the flowing point. The bottom surface of the sheet is not softened or heated to the same extent as the top surface thereof as it is preferable to maintain a greater viscosity in the bottom skin than in the top skin or surface of the sheet up to the point of conversion.

To facilitate starting the apparatus or the initial running of the sheet mass $a$ therethrough, the housing 24 is preferably composed of upper and lower sections, which are separately joined together at the sides of the sheet mass, as shown at 94 (Fig. 4), to permit the top section together with the parts carried thereby to be raised a desired height above the bottom section, thus enabling the forward end of the sheet mass with the starting bait attached thereto to be drawn across the table 5, lower feed apron 35, burner 40, rollers 50 and burner 54. After the sheet has been thus started the top section is lowered in position over the bottom section, and the supply pipes for the upper burner connected up.

The thinned or converted sheet $b$, at a short distance from the converting burners, passes over a supporting table 95, which is preferably covered by a housing 96, and the sheet thence passes into a leer, not shown. The sheet $b$ is advanced by the customary leer conveyer, or in any other suitable manner, at a speed sufficient to take away the same as it flows from the end of the main sheet $a$.

In the modification of the invention illustrated in Figs. 5, 6 and 7, the glass sheet $a$ is shown as flowing directly onto the drum $4^a$ from the furnace $1^a$, so that the rotation of the drum in contact with the glass stream, as it flows from the furnace mouth draws or advances the sheet at its speed of flow from the furnace. The sheet is advanced by the drum over a table $5^a$ in the same manner as described in connection with Fig. 1, and the sheet in its advance over the table is raised to near a converting heat by one or more superposed burners 100, and is then subjected to a converting heat in advance of the table by upper and lower burners 101 and 102. The table 5ª in this arrangement preferably has its top inclined rearwardly toward the drum so that the sheet will advance more freely thereover, and is carried for angular adjustment in the same manner as described in connection with Fig. 1. It is also preferable in this form of apparatus to provide a temperature maintaining burner 103 over the drum and to mount the same for radial and angular adjustment with respect thereto. Each of the burners 100, 101 and 102 are mounted for different adjusting movements with respect to the sheet, as shown.

The width of the sheet $a$ as it flows from the furnace may be determined by a side gauge 104, and a premature cooling of the sheet at its edges by contact with said gauge is prevented by the use of edge burners 105, which direct flames against the respective edges.

In Fig. 8 a modified form of the invention is illustrated in which the column or sheet to be converted is shown as flowing from a furnace 106 through an outlet or spillway 107 by which the sheet is given the desired shape and size, and thence passes over a series of supporting rolls 108 through a converting heat which effects a melting and flowing of the glass forwardly therefrom in the form of a thin sheet $b$, which passes over a supporting table 109 and thence enters a leer 110. The column or main sheet $a$ in its passage through the furnace outlet 107, or before reaching the temperature raising and converting means is subjected to a cooling action by a cooling fluid 111, or other suitable means, whereby its temperature is sufficiently lowered below that of the source of supply to maintain its shape preparatory to having the temperature thereof raised to a converting condition. An initial temperature raising chamber 112 is provided over the sheet $a$ and equipped with burners or other suitable heating means 113 for such purpose, and the converting heat is applied to the sheet mass by a series of burners 114.

It will be understood that while I particularly referred to gas burners for use in controlling or raising the temperature of the glass sheet, electric heaters or other suitable heating means may be employed if desired. It will also be understood that the partial cooling of the main sheet $a$ intermediate the source of supply and the converting means may be accomplished naturally by exposure of the sheet to a cooler atmosphere, or it may be effected by artificial means as best suited to the particular case.

The operation of my invention with reference particularly to the apparatus disclosed in Figs. 1 to 4 is as follows:

Considering a sheet mass $a$ of a thickness too great for commercial ware, such, for instance, as window glass, to be flowing from the furnace 1, or other source of supply, down onto the rotating drum 4 and thence forward through the housing 24 and between the converting burners 53 and 54. The under surface of the sheet is preferably first cooled slightly before coming in contact with the drum 4 by the discharge of a cooling fluid thereagainst from a manifold 10. The burner 14 which is disposed above the drum over the sheet $a$ tends to retard to some extent, but not entirely, the cooling of the sheet, it being necessary for the sheet to be sufficiently cooled to maintain its shape until the converting heat is applied thereto. The sheet mass is fed forward by the rotation of the drum over the table 5, which is preferably hollow and interiorly cooled by the flowing of cooling fluid therethrough, and the sheet thence feeds forward between the aprons 35, which now cooperate with the drum in advancing the sheet mass. It is preferable to maintain the upper surface of the sheet mass at a higher temperature than the lower surface thereof, and for such purpose the housing 24 is provided with the heating chambers 29 and 36, the former of which is disposed over the table 5. As the sheet mass feeds forward through the restricted passage 38 between the burners 41 and 42, its temperature is raised thereby to some extent, and then further raised by heat from the burner 55. The raising of the temperature of the sheet by these burners, however, it is not sufficient to effect a melting or flowing of the glass forming the sheet, such action being effected by the burners 53 and 54 between which the sheet passes, and particularly by the former. The application of the converting heat by the burner 53 causes a melting and forward flowing off of the top portion of the sheet mass, while the lower burner 54 effects a sufficient softening of the bottom surface of the sheet to permit a stretching or forward flowing of a portion of its skin, as is particularly described in connection with my former applications Serial Nos. 232,841 and 246,877. The thin sheet $b$ extends forward into the associated leer (not shown), the conveyer of which effects an advancing of such sheet at a speed properly proportioned to the speed of flow of the gas from the forward end of the sheet mass and suited to the thickness which it is desired to maintain in the thin sheet $b$. The burners 53, 54 and 55 may be readily adjusted relative to the sheet mass as the conditions may require, or the sheet mass conditions may be adjusted to the burners.

It is evident in the practicing of the process described, and the use of the apparatus disclosed that the sheet mass flows in a molten state from a source of supply, is then cooled and solidified to an extent necessary to maintain its shape and is subsequently, while still maintaining a portion of its initial heat, subjected to a converting heat whereby its temperature is raised sufficiently to effect or permit a flowing of the material therefrom in the form of a thinner sheet and in approximately the same direction of travel as the sheet mass, the thinner sheet being advanced from the sheet mass at a greater speed than the speed of travel of said mass.

I wish it understood that while I have described several apparatus for practicing my process, numerous other apparatus may be employed therefor, and also that the apparatus illustrated are capable of numerous modifications and changes without departing from the spirit of the claims.

Having thus described my invention, what I claim as new and desire to secure by Letters Patent, is,—

1. The method of continuously forming sheet glass, which consists in flowing a mass of glass in sheet form from a molten source of supply and subsequently applying a converting heat to a localized portion of the mass to effect a flowing of a relatively thin skin in continuous sheet form from the mass.

2. The method of continuously forming sheet glass, which consists in flowing a mass of glass in sheet form from a molten source of supply, advancing the sheet mass with respect to its source of supply and permitting it to cool, and subsequently applying a converting heat to a localized portion of the mass to melt the surface portions thereof and cause a sheet of less thickness than the mass to form and flow therefrom.

3. The method of continuously forming sheet glass, which consists in flowing a mass of glass in sheet form from a molten source of supply, advancing the sheet mass through means for obtaining a predetermined temperature condition in the mass, and then applying a converting heat to the forward end portion of the mass to melt the surface portions thereof and cause a sheet of less thickness than the mass to form and flow therefrom.

4. The method of continuously forming sheet glass, which consists in the gravity flow of a mass of glass in sheet form from a molten source of supply, advancing the sheet mass through means for obtaining a uniform predetermined temperature condition in the mass, then applying a converting heat to the forward end portion of the mass to melt the surface portions thereof and cause a sheet of less thickness than the mass to form and flow therefrom, and conveying the formed sheet from the mass at the speed of forming and flowing of the sheet.

5. The method of forming sheet glass which consists in the gravity flow of a mass of glass in sheet form from a source of molten glass supply, permitting the sheet mass to cool sufficiently to maintain its shape, advancing the sheet mass in accordance with its speed of flow, and, while still heated, gradually raising the temperature of the sheet to cause a melting and flowing of a sheet of less thickness than the mass forwardly therefrom.

6. The method of forming glass in predetermined shape, which consists in the continuous gravity flow of a stream of glass of predetermined cross-sectional form from a source of supply, advancing the stream in set form through means for obtaining a predetermined temperature condition therein, and then applying a converting heat to the forward end portion of the stream to continuously melt and flow a stream of less cross-sectional size but of the same form from its forward end.

7. The method of forming glass in predetermined shape, which consists in the continuous gravity flow of a stream of glass of predetermined cross-sectional form from a source of supply, advancing the stream through a cooling atmosphere, and, while still retaining a portion of its initial heat, gradually raising the temperature thereof to a converting heat to continuously melt and flow a stream of less thickness from its forward end, and advancing the smaller stream at the speed of forming thereof.

8. The method which consists in flowing a stream of glass of predetermined cross-sectional form from a source of molten supply, advancing the sheet in accordance with the flow, permitting it to partially cool and then passing it through a higher temperature which effects a melting of the stream of metal at a predetermined point in its advance and a free flowing of a relatively thinner stream therefrom.

9. The method of forming sheet glass which consists in the gravity flow of a sheet mass of glass from a source of molten supply, advancing the same in accordance with the flow, and during the advance permitting first a partial cooling and then effecting a raising of its temperature particularly on its top surface sufficiently to flow a sheet of substantially the same width but of less thickness from its forward end.

10. The combination with a furnace from which a stream of metal flows, of a rotating member disposed to support and advance said stream as it flows from the furnace, and means adjustable relatively to the member and operable to apply heat to the stream during its passage over said member.

11. The combination with a furnace from which a stream of metal flows, of a rotating member disposed to support and advance said stream as it flows from the furnace, and means for effecting a cooling of the member contacting side of said stream relative to its other side.

12. The combination with a furnace from which a stream of metal flows, of a rotating member disposed to support and advance said stream as it flows from the furnace, means for effecting a cooling of the member contacting side of said stream, and means for applying heat to the other side of said stream to retard the cooling thereof.

13. The combination with means forming a source from which a molten stream of metal flows, of means operable to support and advance said stream after flowing from said first means, and directly opposed separate means for applying relatively different temperatures to opposite sides of said stream.

14. The combination with means forming a source from which a molten stream of metal flows, of means operable to support and advance said stream after flowing from its source, and separate means adjustable relative to each other and to the stream to apply relatively different temperatures to opposite sides of the stream.

15. The combination with means forming a source from which a molten stream of metal flows, of means for supporting and advancing said stream after flowing from its source, means for applying a cooling temperature to the under side of the stream before having contact with said advancing means, and means disposed over said advancing means for applying heat to the upper surface of the stream to retard the cooling thereof.

16. The combination with means forming a source from which a molten stream of metal flows, of a member operable to support and advance the stream after flowing from said source, adjustable means for applying a cooling temperature to the member contacting side of said stream before having contact with the member, and adjustable means for applying heat to the opposite side of the stream to retard the cooling thereof.

17. The combination with means forming a source from which a stream of molten metal flows, of a rotating member operable to support and advance the stream after flowing from said source, and means adjustable both radially and angularly with respect to the member axis, to apply heat to the upper surface of a stream in its passage over said member.

18. The combination with means forming a source from which a stream of molten metal flows, of a rotatable member disposed in position to support and advance the stream after flowing from said source, a burner disposed without the periphery of said member at the outer side of the stream supported thereby and operable to apply a predetermined heat to the stream, and a frame carrying said burner and adjustable to adjust the burner both radially and angularly with respect to the axis of said member.

19. The combination with means forming a source from which a stream of molten metal flows, of a rotating member mounted to support and advance said stream after flowing from said source, arms mounted at the opposite ends of said member for concentric swinging adjustment relative to the member axis, means for retaining said arms in adjusted position, and a burner for applying heat to the outer side of the stream in its passage over said member, said burner being carried by said arms for swinging adjustment therewith and for radial adjustment relative to said member.

20. The combination with means forming a source from which a stream of molten metal flows, of a rotatable member for supporting and advancing the stream after flowing from the source, and means over which the stream is advanced by said member, said means being mounted adjacent to the member periphery and for substantially concentric angular adjustment relative thereto.

21. The combination with means forming a source from which a stream of molten metal flows, of a rotatable member disposed to support and advance the stream after flowing from its source, a table over which the stream is advanced by said member, and arms angularly adjustable in concentric relation to the member axis and carrying said table at their outer ends.

22. The combination with means forming a source from which a stream of molten metal flows, of a rotatable member disposed to support and advance the stream after flowing from said source, means forming a hollow table through which a cooling fluid circulates and disposed to strip the stream from the periphery of said member and to support the stream for a portion of its course, said last means being angularly adjustable in concentric relation to the member axis.

23. The combination with means forming a source from which a stream of molten metal feeds, of means for guiding and advancing said stream after leaving its source, said means permitting a partial cooling of the metal after feeding from said source, and means for applying heat to the stream at a predetermined point in its advance to effect a melting and free flowing of the metal from the forward end thereof to form a stream of lesser size.

24. The combination with means forming a source from which a stream of molten metal flows by gravity, means for advancing said stream and controlling the temperature thereof, and means for applying a converting heat to said stream at a predetermined point in its advance and to a localized portion thereof to melt and flow the surface metal therefrom in a stream of lesser dimensions than said first stream, said last means being adjustable with respect to the stream.

25. The combination with means forming a source from which a mass of molten metal flows by gravity in sheet form, means for advancing said sheet mass and controlling the temperature thereof to permit first a cooling of the same to maintain its shape, and then to gradually raise the temperature thereof, and means for applying a converting heat to the sheet mass at a predetermined point in its advance to effect a superficial melting and flowing of the metal from the forward end thereof in the form of a sheet of lesser thickness.

26. The combination with means for advancing a stream of partially solidified metal, of bracket arms carried by said means for vertical swinging adjustment relative thereto, and a heater carried by said arms for vertical swinging adjustment relative thereto, said heater being adapted to apply a converting heat to said stream to flow the metal forwardly therefrom in the form of a stream of smaller dimensions.

27. The combination with means forming a source from which a sheet mass of metal advances, of means forming a housing for the sheet mass, said housing having a heating chamber and a restricted passage through which the sheet mass travels, the bottom wall of said passage supporting the sheet mass in its passage thereover, and the top wall of the passage being adjacent to the top surface of the sheet mass, means for heating said top and bottom walls, means for heating said chamber, means within the chamber for coacting with the sheet mass to feed it forward, and means for applying a converting heat to the sheet mass in advance of said passage to effect a melting and flowing of the metal in relatively thin sheet form from the forward end of the sheet mass.

28. The combination with means for advancing a sheet mass of glass, of a heater subjacent to an advanced portion of the sheet for applying heat thereto, and means carrying said heater and operable to effect a tilting adjustment thereof, an adjustment thereof toward and away from the sheet and an adjustment thereof longitudinally of the sheet.

29. The combination with means for advancing a sheet mass of glass, of upper and lower heaters for applying a converting heat to the mass to melt and flow the glass from the forward end thereof in the form of a relatively thinner sheet, separate means carrying said heaters for various adjustment with respect to the sheet.

30. In combination, means forming a heating chamber, means for supporting and conveying a set mass of glass of sheet form through the chamber, means for applying a melting heat to the forward end of the mass to freely flow therefrom a sheet of lesser thickness than the mass, and means operable to continuously add to the rear of the mass from a molten source of supply to form an unbroken stream between the source and forward end of the mass and to maintain a continuity of flow from the forward end of the mass.

31. The combination with means for advancing a sheet mass of glass, of a heater having supply means, and also having slots arranged lengthwise with the heater, and adjusting means for the slots.

32. The method of forming glass, which consists in flowing a column from a supply of molten glass, allowing the column to cool until gravity does not vary its cross section, applying a melting heat to the advance end of the cooled column, removing the glass as melted, and allowing it to set in final shape as removed.

33. The method of forming glass, which consists in flowing a continuous column from a source of molten glass, progressively cooling the column below the point where gravity will vary its cross section, progressively melting the advance end of the cooled column in such a manner that the melted portion will flow over the cooled portion and vary the cross section of the column, and allowing the glass to set in the cross section resulting from such flowing.

34. The method of making sheet glass, which consists in flowing a thick sheet from a supply of molten glass, cooling the sheet as it advances, progressively remelting the sheet, and allowing the glass as it melts to flow across the end of the thick sheet to form a relatively thin sheet.

In testimony whereof, I have hereunto signed my name to this specification.

ROBERT M. CORL.